July 29, 1969
L. T. VALENTINE
3,458,106
VACUUM SUPPLY FOR INTERNAL PIPELINE
LINE-UP CLAMP SEAL SPACE
Filed Sept. 8, 1967
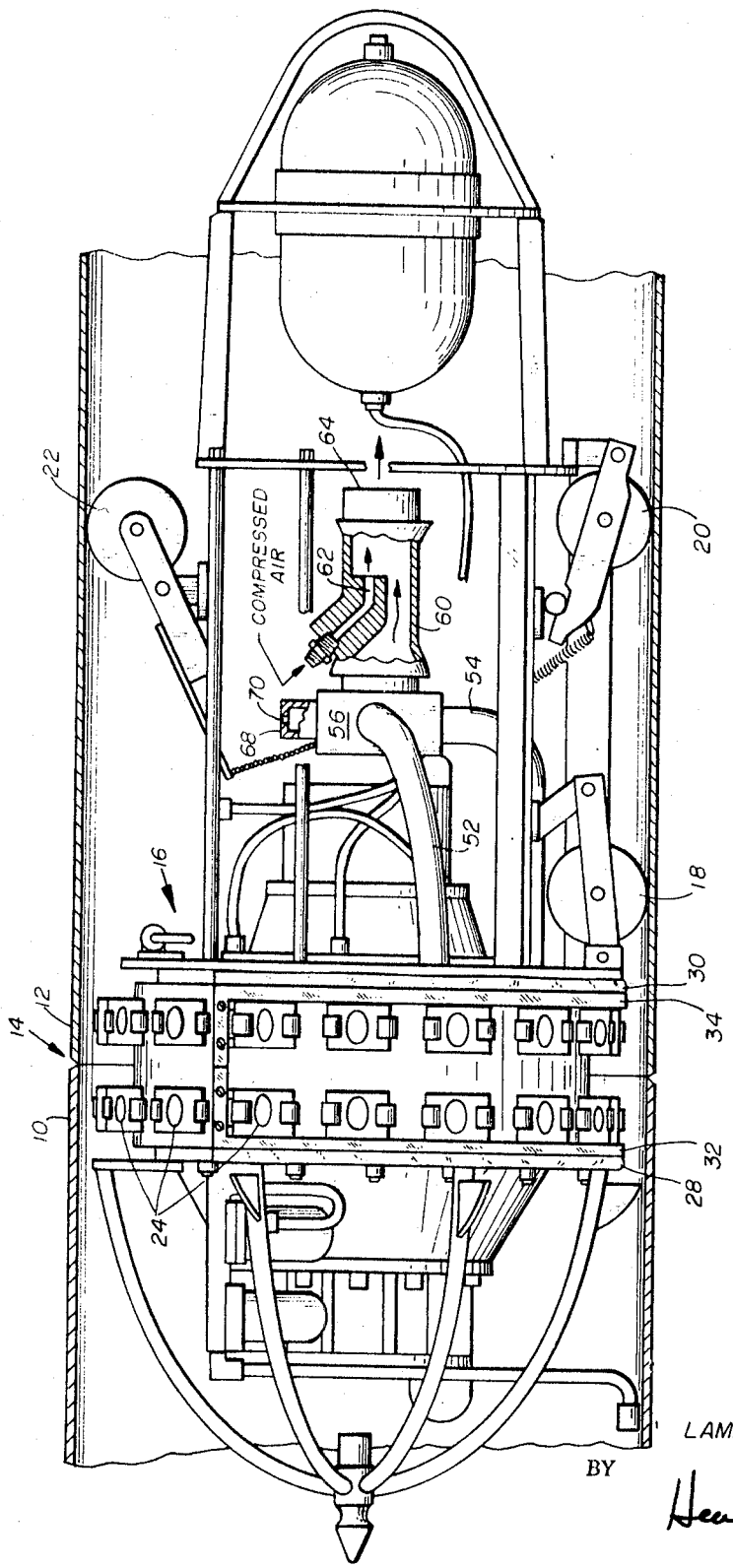
INVENTOR.
LAMAR T. VALENTINE
BY
*Head & Johnson*
ATTORNEYS

United States Patent Office 3,458,106
Patented July 29, 1969

3,458,106
VACUUM SUPPLY FOR INTERNAL PIPELINE LINE-UP CLAMP SEAL SPACE
Lamar T. Valentine, Tulsa, Okla., assignor of fifty percent to Joseph L. Parker, Tulsa, Okla.
Continuation-in-part of application Ser. No. 650,274, June 30, 1967. This application Sept. 8, 1967, Ser. No. 666,431
Int. Cl. B23k *19/00, 5/22, 9/02*
U.S. Cl. 228—44    3 Claims

ABSTRACT OF THE DISCLOSURE

A vacuum supply means provides controlled low pressure to a sealed space utilized in combination with an internal pipeline line-up clamp as is used in the welding of abutted elements, particularly lengths of pipe. The vacuum or low pressure in the internal sealed space will override the gravity influence of the welding process.

CROSS-REFERENCES TO RELATED APPLICATIONS

This application is a continuation-in-part of Ser. No. 650,274, filed June 30, 1967, Ser. No. 666,432 filed Sept. 8, 1967 entitled Vacuum Seal for Internal Pipeline Line-Up Clamp and Ser. No. 666,336 filed Sept. 8, 1967 entitled 360° Vacuum Seal Control for Internal Pipeline Line-Up Clamp.

BACKGROUND OF THE INVENTION

In the welding of pipe utilized in a continuous length pipeline, the primary object is to achieve a weld which is at least equal to and preferably stronger than the pieces being welded. Rigid inspection is made of each joint after the welding process, by X-ray or known inspection processes to assure that this objective is achieved. Typically, in the welding of successive joints of pipeline, the process is usually done while the pipe is substantially horizontal, depending of course upon the terrain. The next successive joint of pipe is aligned and abutted with the succeeding joint and the welding process begins.

As is explained in the above identified prior copending applications, during thermal welding of the upper portion of abutted lengths of pipe, the force of gravity tends to draw the molten weld metal towards the interior thereof. On the other hand, during the welding of the lower portion, gravity tends to cause the molten weld metal to flow towards the extremity of the pipe. Hence, in some situations, an accomplished welder can secure an adequate weld in the upper portion of the pipe having the desired strength and other characteristics, which becomes extremely difficult and in some instances impossible to obtain an adequate weld in the lower portion of the pipe wherein the weld forms an interior bead within the interior of the pipe. That is, it has been found the desired configuration of a complete weld around the pipe includes a portion of molten weld metal extending at least to or slightly within the interior of the pipe around the full internal circumference. It has been found that control over the amount of low pressure in the sealed spaces of an internal pipeline line-up clamp as described in the above copending applications is a function of the welding process. That is, as the welding of abutted pipe progresses the amount of low pressure in the sealed space changes hence changing the characteristics of the resultant weld. In addition, means for creating the low pressure should be dependent upon available power sources.

Accordingly, it is an object of this invention to provide a vacuum or low pressure supply means which overcomes objections to prior art devices and problems in satisfactorily welding pipelines.

It is another object of this invention to provide a method and means for accomplishing a finished weld about abutted pipe ends having a satisfactory and quality weld configuration capable of passing destructive and nondestructive test standards.

It is another object of this invention to provide a means for accomplishing a satisfactory weld configuration which is adaptable to be used in combination with an internal pipeline line-up clamp.

Another object of this invention is to provide a vacuum or low pressure supply means in conjunction with one or more internal sealed spaces or zones of an internal pipeline line-up clamp and provide means to control said low pressure to said spaces as required to effect the desired weld characteristic.

BRIEF DESCRIPTION OF THE DRAWING

The drawing is an elevational view partly in section of the apparatus of this invention.

DESCRIPTION OF THE PREFERRED EMBODIMENTS

Referring now to FIGURE 1, pipe 10 is to be welded to pipe 12 at the single V-groove, generally indicated by the numeral 14 formed by beveling the ends of the pipe in a manner well known to those skilled in the art. To align the two pipe ends an internal pipeline line-up clamp, generally referred to by the numeral 16, is adapted to be inserted, centralized and supported for travel within the pipe on rollers 18, 20 and 22. The clamp is adapted to be pulled and/or pushed into the pipe section. The line-up clamp includes a first circumferential row of reciprocal plungers or dogs 24 substantially coaxial to said clamp axis and parallel spaced second row of circumferential dogs 26 likewise coaxial to said clamp axis. The plungers are adapted to be fluid actuated either hydraulically, but preferably pneumatically to be reciprocated outwardly into engagement with the internal periphery of respective pipes 10 and 12. That is, the circumferential row of dogs 24 are independently actuated outward into engagement with pipe 10, whereas dogs 26 are likewise simultaneously and independently engageable with pipe 12 so as to straddle the joint forming the V-groove 14, within which the welding is to take place.

Independently associated with each row of dogs are resilient seal members more aptly described in the aforementioned copending applications which coact to form a lower seal space interiorly of the abutted pipe ends. Each seal includes respective resilient or expandable boots 28 and 30 and integral peripheral arcuate seal strips 32 and 34. The seal strips are arcuate members supported upon extensions of the respective dogs 24 and 26 by the retracting force of the resilient strip which is stretched thereabout. Each resilient and expandable boot 28 and 30 is sealably connected to outward flanges formed as a part of the liner clamp body 40 being retained thereto by bolts or other interconnection means. At least one vacuum or low pressure supply connection is required preferably three which includes lines 52, 54 shown in FIGURE 1, and an identical line opposite conduit 52 on the other side, not seen in this view. These conduits interconnect to a central vacuum accumulation chamber 56 which is interconnected to the inlet of vacuum jet pump 60. The pump 60 is a venturi or jet type nozzle having a jet conduit 62 fed by a compressed air or other fluid source usually available on the job. The jet orifice and venturi effect causing a withdrawal of air through conduits 52 and 54, etc. exhausting to the atmosphere through outlet 64. It has been found that by providing a changeable orifice plate 68 with various orifice sizes 70 the desired seal space pressure about the pipe joint may be controlled for different pipe sizes and/or resulting weld desired. In addition this inven-

OPERATION

As shown in FIGURE 1, pipe 10 represents the end to which pipe 12 is to be welded at the single V-groove 14. Pipe 12 is supported in substantially aligned position. In the event the welding process of the previous joint has been completed, pipeline line-up clamp 16 is pulled by means, not shown, to the position substantially shown in FIGURE 1 wherein dogs 24 and 26 are caused to be aligned straddling proposed joints to be welded. To cause exact alignment of the two sections of pipe, dogs 24 are expanded radially outward such as by pneumatic or hydraulic means supplied from an exterior source and not shown. Thereafter dogs 26 are expanded radially outward into engagement of the interior of pipe 12 and thus support the abutted joint in coaxial alignment. In the expanded position the seal strips and boots create a confined space about the lower section of pipe and preferably approximately the lower 225° of the pipe or about the entire inner periphery as disclosed in copending application Ser. No. 666,336. Compressed air is led to jet nozzle 62 causing withdrawal of air from the space through the abutted pipe joint interiorly as the welding process therearound begins. The low pressure air is withdrawn through conduits 52, 54 and a like conduit on the other side, not shown. When the welding process is completed, the dogs 24 and 26 are retracted and the process is repeated for the next section of pipe.

The invention has been described with reference to specified and preferred embodiments. It will be apparent, however, that other modifications can be made without departing from the spirit and scope of the invention. For example, additional low pressure pump means, such as that described herein can be utilized for each confined space about the periphery. Accordingly, this invention should be construed not to be limited to the embodiment herein described but should be limited only by the scope of the appended claims.

What is claimed is:

1. In an internal pipeline line-up clamp having parallel circumferential coaxial rows of outwardly expandable dogs alignable within said pipe to straddle abutted pipe ends for welding and seal means movable with said dogs to engage with the inner periphery of said pipe and create at least one substantially confined space about the inner periphery of said abutted pipe ends the improvement comprising in combination, means comprising a jet nozzle low pressure accumulation chamber and conduit communicating with said confined space, attached to said clamp, and means supplying high pressure fluid to said nozzle to cause withdrawal of fluid from each of said confined spaces through said conduit and chamber to exhaust.

2. A clamp according to claim 1 wherein said accumulation chamber includes a replaceable orifice to control the desired low pressure in said accumulation chamber and said confined space.

3. A clamp according to claim 1 including means to control said high pressure fluid to said jet nozzle responsive to a desired pressure condition in each of said confined spaces.

References Cited

UNITED STATES PATENTS

| 3,387,761 | 6/1968 | Pickard | 228—50 |
| 3,018,358 | 11/1962 | Schaaf | 219—72 |

RICHARD H. EANES, JR., Primary Examiner

U.S. Cl. X.R.

219—72; 228—50